Figure 1:
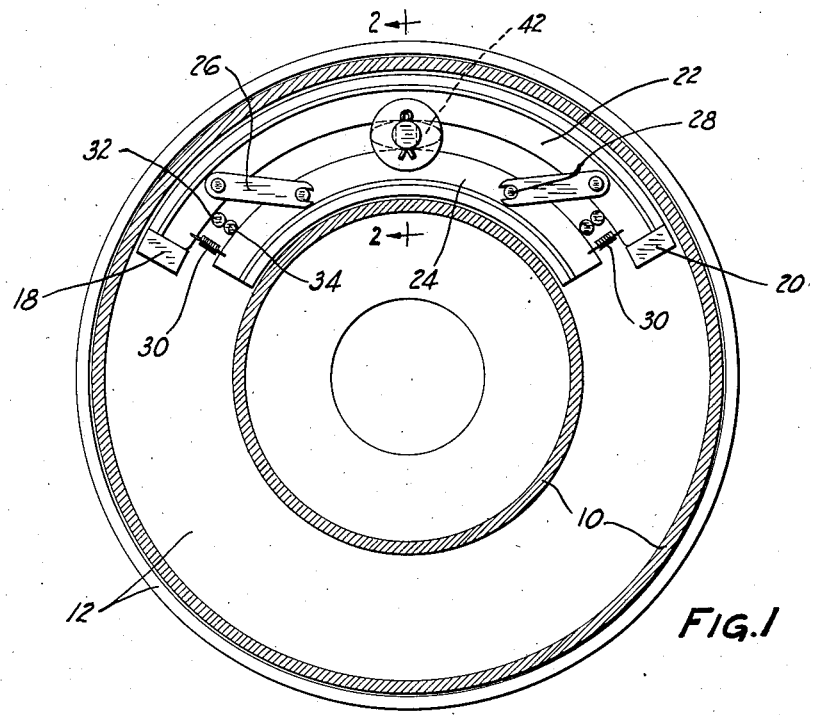

Sept. 4, 1934.  R. S. SANFORD  1,972,203
BRAKE
Filed April 29, 1931

INVENTOR.
ROY S. SANFORD
BY
ATTORNEY.

Patented Sept. 4, 1934

1,972,203

UNITED STATES PATENT OFFICE 1,972,203

BRAKE

Roy S. Sanford, South Bend, Ind., assignor to Bendix Brake Company, South Bend, Ind., a corporation of Illinois Application April 29, 1931, Serial No. 533,729

8 Claims. (Cl. 188—78)

This invention relates to brakes.

An object of the invention is to provide a brake in which movement of the operating means will be uniform under all conditions.

Another object of the invention is to provide a duplex brake.

Another object of the invention is to provide a brake drum having two braking surfaces arranged in spaced parallel relation.

A further object of the invention is to provide a brake having two braking surfaces arranged concentrically and in spaced relation.

Still a further object of the invention is to provide a brake having parallel friction elements operable simultaneously through a single means.

Yet a further object of the invention is to provide a brake structure including concentrically arranged braking surfaces and frictional means interposed between the surfaces and movable radially for engagement with the braking surfaces.

Figure 2:
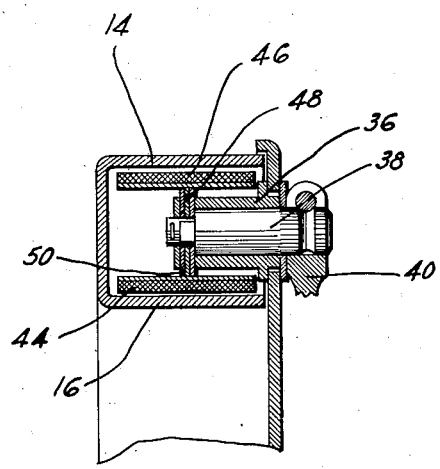

Other objects of the invention will appear from the following description taken in connection with the drawing which forms a part of this specification, and in which:

Figure 1 is a vertical sectional view of a brake illustrating the invention as applied; and Figure 2 is a sectional view substantially on line 2—2, Figure 1.

Referring to the drawing for more specific details of the invention, 12 represents a backing plate. Associated with the backing plate is a drum 10 which may be secured to a wheel, not shown. The drum has spaced annular braking surfaces 14 and 16. As shown, the drum includes an annular plate provided with parallel braking flanges arranged concentrically.

Positioned on the backing plate are spaced anchors 18 and 20, and arranged for movement on the backing plate between the anchors 18 and 20 is a friction element or shoe 22, and arranged on the backing plate concentrically to the shoe 22 is a shoe 24. The shoe 22 has pivotally secured thereto adjacent its ends links 26. These links are provided with bifurcated ends embracing stops 28 on the shoe 24, to provide suitable anchorage for the shoe 24, and connected between the shoes 22 and 24 are return springs 30 adapted to normally retain the shoes against suitable adjustable stops 32 and 34.

Positioned on the backing plate between the shoes is a floating bracket 36 in which is positioned a rotatable shaft 38 controlled through an operating lever 40. The shaft 38 has positioned thereon a cam 42 adapted to engage the shoes and to spread them into drum engagement. As shown, the shoes 22 and 24 have secured thereto suitable linings 44 and 46 adaptable for cooperation with the braking surface of the drum and the shoes are provided with webs 48 equipped with reinforcing plates 50.

In operation, force is applied to the lever 40 to rotate the shaft 38. Upon rotation with shaft 38 the cam 42 is actuated to spread the shoes apart into engagement with the flanges 14 and 16 on the drum, and upon release of the applied force, the springs 30 return the shoes to the off position against the adjustable stops 32 and 34 in proper spaced relation to the braking surface of the drum. Because of the simultaneous movement of the shoes and the floating operating cam, the pedal movement for accelerating the cam will be uniform under all conditions.

It will be apparent that the shoe 24 anchors through either link 26 or 28 upon the anchored shoe 22 depending upon whether counterclockwise or clockwise rotation of drum 10 takes place, and that due to the oblique arrangement of these links, the force applied to either link by the friction of shoe 24 on the inner drum tends to spread the shoes and increase the shoe pressures upon their respective drums, thereby in effect producing a certain degree of self-actuation.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising concentric braking surfaces, friction elements between the braking surfaces, control means between the friction elements for spreading the friction elements into drum engagement anchorage means for one of said elements, and means through which the other element anchors on said one element.

2. A brake comprising concentric braking surfaces, friction elements arranged in spaced relation between the braking surfaces, means between the friction elements for spreading the elements simultaneously into engagement with the breaking surfaces, and connections through which one of said elements anchors on the other.

3. A brake comprising concentrically arranged braking surfaces, spaced arcuate friction elements between the braking surfaces, means for spreading the friction elements into engagement with the braking surfaces, and links at the ends of said elements through one or the other of which one of said elements anchors on the other and increases the effective pressure on said other.

4. A brake comprising arcuate friction elements arranged in parallel spaced relation, a manually operated member between the elements for spreading the elements apart, and means connecting the ends of the elements and transferring the braking torque of one element to the other element as a brake-applying pressure.

5. A brake comprising arcuate friction elements arranged in spaced parallel relation, links yieldingly connecting the friction elements, and an operating cam between the elements.

6. A brake comprising arcuate friction elements arranged in spaced parallel relation, links pivoted to one of the friction elements and having an overrunning connection with the other friction element, springs connecting the friction elements, stops for limiting the movement of the friction elements toward each other and an operating cam between the friction elements.

7. A brake comprising a fixed support, spaced anchors on the fixed support, a rotatable drum associated with the fixed support, flanges on the drum arranged concentrically, an arcuate friction element on the fixed support between the anchors, a second arcuate friction element on the support parallel to the first friction element, links pivoted to one of the friction elements and having an overrunning connection with the other friction element, stops limiting the movement of the friction elements toward each other, springs normally retaining the friction elements against the stops and an operating member between the friction elements.

8. A brake comprising a fixed support, a rotatable drum associated therewith, flanges on the drum arranged concentrically, anchors on the support arranged in spaced relation, an arcuate friction element on the fixed support between the anchors, a second arcuate friction element on the support arranged in spaced parallel relation to the first friction element, links pivoted to one of the friction elements and having overrunning connections with the other friction element, stops for limiting the movement of the friction elements toward each other, springs for retaining the friction elements against the stops and an operating cam positioned between the friction elements for spreading the elements into drum engagement.

ROY S. SANFORD.